United States Patent
Myard et al.

(10) Patent No.: US 7,323,241 B2
(45) Date of Patent: Jan. 29, 2008

(54) COMPOSITE MATERIALS COMPRISING A REINFORCING MATERIAL AND A STAR POLYAMIDE AS A THERMOPLASTIC MATRIX, THE PRECURSOR COMPOUND ARTICLE OF SAID MATERIALS AND THE PRODUCTS OBTAINED USING SAME

(75) Inventors: Philippe Myard, Collonge au Mont D'Or (FR); Frédéric Philippon, Ecully (FR)

(73) Assignee: Rhodia Industrial Yarns AG, Emmerbrucke (CH)

( * ) Notice: Subject to any disclaimer, the term of this patent is extended or adjusted under 35 U.S.C. 154(b) by 529 days.

(21) Appl. No.: 10/491,458

(22) PCT Filed: Sep. 30, 2002

(86) PCT No.: PCT/FR02/03326

§ 371 (c)(1),
(2), (4) Date: Oct. 6, 2004

(87) PCT Pub. No.: WO03/029350

PCT Pub. Date: Apr. 10, 2003

(65) Prior Publication Data

US 2006/0234025 A1 Oct. 19, 2006

(30) Foreign Application Priority Data

Oct. 1, 2001 (FR) .................................. 01 12617

(51) Int. Cl.
*B32B 27/04* (2006.01)
(52) U.S. Cl. ................. 428/296.4; 428/297.4
(58) Field of Classification Search ............. 428/296.7, 428/297.4; 528/332
See application file for complete search history.

(56) References Cited

U.S. PATENT DOCUMENTS

| 4,599,400 | A | * | 7/1986 | Tomalia et al. | 528/405 |
| 5,530,092 | A | * | 6/1996 | Meijer et al. | 528/363 |
| 5,698,662 | A | * | 12/1997 | Stoelwinder et al. | 528/363 |
| 5,760,163 | A | * | 6/1998 | Fisch et al. | 528/310 |
| 6,060,580 | A | * | 5/2000 | Nijenhuis et al. | 528/332 |
| 6,160,080 | A | * | 12/2000 | Cucinella et al. | 528/170 |

FOREIGN PATENT DOCUMENTS

| EP | 0682057 A1 | * | 11/1995 |
| EP | 0832149 B1 | * | 7/2000 |

* cited by examiner

*Primary Examiner*—N. Edwards
(74) *Attorney, Agent, or Firm*—Buchanan, Ingersoll & Rooney, PC

(57) ABSTRACT

The invention relates to a precursor article of a composite material comprising a polymer matrix and at least one reinforcing wire and/or fibres, said article comprising at least one reinforcing wire and/or fibres and at least one polymer matrix wire and/or fibres. The invention is characterised in that: said reinforcing wire and/or fibres are made from a reinforcing material and may comprise a thermoplastic polyamide part; said polymer matrix wire and/or fibres are made from thermoplastic polyamide; and the thermoplastic polyamide of said reinforcing wire and/or fibres and/or said polymer matrix wire and/or fibres comprise at least one polyamide with a star structure which contains: star macromolecular chains comprising one or more cores and at least three branches or three polyamide segments which are linked to the core; if necessary, linear polyamide macromolecular chains.

23 Claims, 1 Drawing Sheet

COMPOSITE MATERIALS COMPRISING A REINFORCING MATERIAL AND A STAR POLYAMIDE AS A THERMOPLASTIC MATRIX, THE PRECURSOR COMPOUND ARTICLE OF SAID MATERIALS AND THE PRODUCTS OBTAINED USING SAME

This application is an application under 35 U.S.C. Section 371 of International Application Number PCT/FR02/03326 filed on Sep. 30, 2002.

The field of the invention is that of composite materials and of the processes for their manufacture.

More specifically, the invention relates to the use of a polyamide possessing a star structure which is employed for the impregnation of reinforcing materials, particularly in the form of yarns and/or of fibers, which are intended to act as thermoplastic matrix, in composite materials.

The term "yarn" is understood to mean a monofilament, a continuous multifilament yarn or a strand of fibers obtained from a single type of fiber or from several types of fibers in an intimate mixture. The continuous yarn can also be obtained by combining several multifilament yarns.

The term "fiber" is understood to mean a filament or a combination of cut, split or converted filaments.

In the field of high performance materials, composites have assumed a dominating position because of their performance and the savings in weight which they allow; The currently most well known high performance composites are obtained from thermosetting resins, the use of which is limited to small-scale applications, mainly in aeronautics or motor sports, and, in the best cases, which exhibit manufacturing times in the region of approximately fifteen minutes, such as, for example, during the manufacture of skis. The cost of these materials and/or the manufacturing times render them incompatible with use in mass production.

One reply, in regard to the manufacturing times, is given by composites comprising a thermoplastic matrix. Thermoplastic resins are generally known for their high viscosity, which constitutes a check as regards the impregnation of the reinforced materials, generally composed of very dense multifilament bundles. The use of the thermoplastic matrices available on the market, in particular polyamide matrices, results in a difficulty in impregnation, requiring either prolonged impregnation times or significant processing pressures. In most cases, the composite materials obtained from these matrices may exhibit microspaces and unimpregnated regions. These microspaces bring about declines in mechanical properties, premature aging of the material and problems of delamination when the material is composed of several reinforcing layers.

Several routes have been explored to improve the impregnation of the reinforcing yarns by the matrix and the adhesion between the reinforcing yarns and the matrix.

The first of these routes has consisted in using linear polyamides with a reduced molecular weight as matrix.

Thus, the document FR-2 158 422 discloses a composite sheet composed of a polyamide matrix and of reinforcing fibers of glass fiber type. The polyamide is obtained by polycondensation of ε-caprolactam, the molecular weight of which is between 3000 and 25 000, having the ability, by virtue of its low viscosity and therefore its low surface tension, to suitably impregnate the reinforcing fibers and thus to limit the appearance of microspaces in the finished product. This document also discloses a process for forming this composite sheet.

Generally, the use of polyamides of low molecular weights in the matrix exhibits the major disadvantage of detrimentally affecting the mechanical properties of the composite, in particular as regards the ultimate strength, the yield strength and the fatigue behavior. This is because, during the use of high performance composites reinforced by long fibers, the mechanical properties of these composites depend on the plasticity of the matrix, which transmits the stresses to the reinforcing material, and on the mechanical properties of the matrix.

Another route which makes it possible to improve the impregnation of the reinforcing fibers by the matrix consists in employing a matrix which is provided in the form of an oligomer or of a prepolymer of low molecular weight which can be polymerized by polycondensation in situ.

Thus, the document FR-A-2 603 891 relates to a process for the manufacture of a composite material composed of a polyamide matrix reinforced by long reinforcing fibers. These fibers are impregnated with a polyamide prepolymer or oligomer which comprises, at each end of the molecular chain, a reactive functional group capable of reacting with another oligomer or prepolymer molecule under the effect of heating, resulting in the elongation of the polymer chain to produce a polyamide of high molecular weight. The oligomer or prepolymer of low molecular mass has the characteristic of being fluid in the molten state. The polyamides used are preferably polyamide-6, polyamide-6,6, polyamide-6,10, polyamide-6,12, polyamide-11 and polyamide-12. The impregnated fibers are subsequently pultruded through a shaping die at high temperature in order to form profiles.

This process remains similar to conventional polymerization processes and thus exhibits cycle times incompatible with a rapid production rate. If the cycle times are adjusted so as to render them compatible with mass production, the molecular weight of the polyamide obtained and constituting the matrix is too low to confer, on the matrix, a satisfactory level of mechanical properties.

The document EP-B-0 133 825 discloses a flexible composite material mainly composed of a reinforced material in the form of a lock of parallel continuous fibers which are impregnated with thermoplastic powder, preferably with polyamide powder, and of a thermoplastic matrix in the form of a sheath around the lock of continuous fibers, it being possible for this sheath also to be made of polyamide. This material is characterized in that the polymer constituting the thermoplastic matrix has a melting point lower than or equal to that of the polymer constituting the thermoplastic powder, so that the sheathing of the fibers covered with powder is achieved by melting the thermoplastic matrix, but without melting the powder, so that the latter isolates the fibers from the sheath.

A disadvantage of the use of a thermoplastic polymer in the form of a powder is the need to use complex equipment which limits the amount of composite obtained. It is therefore clearly apparent that this process is not very compatible with mass production.

The document U.S. Pat. No. 5,464,684 discloses a hybrid yarn comprising a core of an intimate mixture of reinforcing filaments and of filaments of polyamides of low viscosity, forming the matrix. This nucleus is covered with a continuous yarn of polyamide, preferably of the same type as that used for the nucleus. The polyamide used is of the nylon-6 or nylon-6,6 type but can also be composed of nylon-6,6T, nylon-6,10, nylon-10 or a polyamide of adipic acid and of 1,3-xylylenediamine. The reinforcing fibers are carbon fibers or glass fibers.

The technique used to manufacture such a hybrid yarn is certainly suitable for small-scale applications, such as the manufacture of tennis racquets. However, it is difficult to conceive of the use of such a method on a larger scale.

The analysis of the state of the art shows that the improvement in the performance of composite materials, centered on the improvement in the impregnation of the matrix into the reinforcing material, does not meet the requirements either of mechanical properties or of processing time of the mass production applications targeted by the thermoplastic composite materials.

The object of the present invention is thus to overcome these disadvantages by providing a precursor article of a composite material comprising different types of yarns and/or of fibers and in particular at least one reinforcing yarn and/or reinforcing fibers and at least one yarn and/or fibers which generate(s) a thermoplastic matrix exhibiting a high fluidity in the molten state, making possible very good impregnation of the reinforcing yarns and/or reinforcing fibers during the formation of the composite material. Such an article makes it possible to obtain a composite material by a simple and rapid thermoforming technique.

Another object of the invention is to provide a composite material obtained from this article and exhibiting good mechanical properties.

Figure 1:
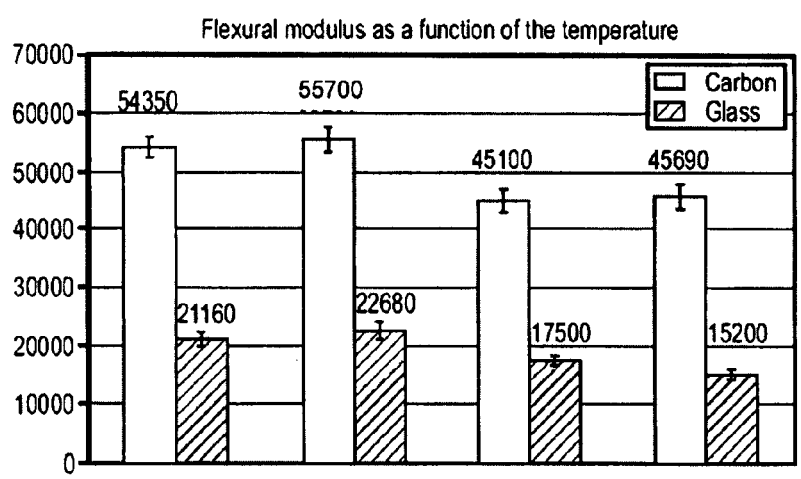
FIG. 1 is a graphic illustrating the influence of temperature on flexural modulus of a material form according to the present invention.

Finally, a last object of the invention is to provide a composite material exhibiting an advantage in reducing manufacturing costs by the use of machinery employing low pressures and shortened cycle times.

The invention relates to a precursor article of a composite material comprising a polymeric matrix and at least one reinforcing yarn and/or reinforcing fibers, said article comprising at least one reinforcing yarn and/or reinforcing fibers and at least one polymeric matrix yarn and/or polymeric matrix fibers, characterized in that:

said reinforcing yarn and/or said reinforcing fibers are made of reinforcing material and optionally comprise a part made of thermoplastic polyamide, said polymeric matrix yarn and/or said polymeric matrix fibers are made of thermoplastic polyamide, and in that said thermoplastic polyamide of said reinforcing yarn and/or of said reinforcing fibers and/or of said polymeric matrix yarn and/or of said polymeric matrix fibers comprises at least one polyamide possessing a star structure comprising:

star macromolecular chains comprising one or more cores and at least three polyamide branches or three polyamide segments bonded to a core, if appropriate, linear polyamide macromolecular chains.

The polyamide possessing a star structure is a polymer comprising star macromolecular chains and, if appropriate, linear macromolecular chains. The polymers comprising such star macromolecular chains are, for example, disclosed in the documents FR 2 743 077, FR 2 779 730, EP 0 682 057 and EP 0 832 149. These compounds are known to exhibit an improved fluidity with respect to linear polyamides.

The star macromolecular chains comprise a core and at least three polyamide branches. The branches are bonded to the core by a covalent bond, via an amide group or a group of another nature. The core is an organic or organometallic chemical compound, preferably a hydrocarbonaceous compound optionally comprising heteroatoms and to which the branches are connected. The branches are polyamide chains. The polyamide chains constituting the branches are preferably of the type of those obtained by polymerization of lactams or amino acids, for example of polyamide-6 type.

The polyamide possessing a star structure according to the invention optionally comprises, in addition to the star chains, linear polyamide chains. In this case, the ratio by weight of the amount of star chains to the sum of the amounts of star chains and of linear chains is between 0.1 and 1, limits included. It is preferably between 0.5 and 1.

According to a preferred embodiment of the invention, the polyamide possessing a star structure, that is to say comprising star macromolecular chains, is obtained by copolymerization of a mixture of monomers comprising at least:

a) monomers of following general formula (I):

(I)

b) monomers of following general formulae (IIa) and (IIb):

(IIa)

or

(IIb)

c) optionally monomers of following general formula (III):

(III)

in which:

$R_1$ is an aliphatic or aromatic, cyclic or linear, hydrocarbonaceous radical comprising at least 2 carbon atoms which can comprise heteroatoms, A is a covalent, bond or an aliphatic hydrocarbonaceous radical which can comprise heteroatoms and which comprises from 1 to 20 carbon atoms, Z represents a primary amine functional group or a carboxylic acid functional group, Y is a primary amine functional group when X represents a carboxylic acid functional group or Y is a carboxylic acid functional group when X represents a primary amine functional group, $R_2$ and $R_3$, which are identical or different, represent substituted or unsubstituted, aromatic, cycloaliphatic or aliphatic hydrocarbonaceous radicals comprising from 2 to 20 carbon atoms which can comprise heteroatoms, m represents an integer between 3 and 8.

The term "carboxylic acid" is understood to mean carboxylic acids and their derivatives, such as acid anhydrides, acid chlorides, esters, and the like.

Processes for producing these star polyamides are disclosed in the documents FR 2 743 077 and FR 2 779 730. These processes result in the formation of star macromolecular chains, as a mixture with optionally linear macromolecular chains.

If a comonomer of formula (III) is used, the polymerization (polycondensation) reaction is advantageously carried out until thermodynamic equilibrium is reached.

The monomer of formula (I) can also be blended with a molten polymer during an extrusion operation.

Thus, according to another embodiment of the invention, the polyamide possessing a star structure is obtained by melt blending, for example using an extrusion device, a polyamide of the type of those obtained by polymerization of lactams and/or amino acids and a monomer of formula (I).

Such preparation processes are disclosed in patents EP 0 682 070 and EP 0 672 703.

According to a specific characteristic of the invention, the $R_1$ radical is either a cycloaliphatic radical, such as the tetravalent cyclohexanonyl radical, or a 1,1,1-propanetriyl or 1,2,3-propanetriyl radical.

Mention may be made, as other $R_1$ radicals suitable for the invention, by way of example, of substituted or unsubstituted trivalent phenyl and cyclohexanyl radicals, tetravalent diaminopolymethylene radicals with a number of methylene groups advantageously of between 2 and 12, such as the radical originating from EDTA (ethylenediaminetetraacetic acid), octavalent cyclohexanonyl or cyclohexadinonyl radicals, and the radicals originating from compounds resulting from the reaction of polyols, such as glycol, pentaerythritol, sorbitol or mannitol, with acrylonitrile.

Advantageously, at least two different $R_2$ radicals can be employed in the monomers of formula (II).

The A radical is preferably a methylene or polymethylene radical, such as the ethyl, propyl or butyl radicals, or a polyoxyalkylene radical, such as the polyoxyethylene radical.

According to a specific embodiment of the invention, the number m is greater than or equal to 3 and advantageously equal to 3 or 4.

The reactive functional group of the multifunctional compound represented by the symbol Z is a functional group capable of forming an amide functional group.

Preferably, the compound of formula (I) are chosen from 2,2,6,6-tetra(β-carboxyethyl)cyclohexanone, trimesic acid, 2,4,6-tri(aminocaproic acid)-1,3,5-triazine and 4-aminoethyl-1,8-octanediamine.

The mixture of monomers which is the source of the star macromolecular chains can comprise other compounds, such as chain-limiting agents, catalysts or additives, such as light stabilizers or heat stabilizers.

The polyamide yarn and/or polyamide fibers intended to act as matrix will be referred to hereinafter as "matrix yarn and/or matrix fibers".

Advantageously, the polyamide possessing a star structure exhibits a number-average molecular mass at least equal to 15 000.

Advantageously, when the reinforcing yarn and/or reinforcing fibers comprise a polyamide possessing a star structure, the latter is preferably provided in the form of a sheath of polyamide which covers the reinforcing yarn and/or reinforcing fibers.

According to an alternative form of the invention, the matrix yarn and/or matrix fibers are obtained from a blend of the polyamide possessing a star structure and of a linear polyamide.

According to another alternative form, the precursor article of the composite material also comprises at least one matrix yarn and/or matrix fibers made of linear polyamide.

According to a preferred characteristic, this linear polyamide is an aliphatic and/or semicrystalline polyamide or copolyamide chosen from the group consisting of PA-4,6, PA-6, PA-6,6, PA-6,9, PA-6,10, PA-6,12, PA-6,36, PA-11 and PA-12, or a semicrystalline semiaromatic polyamide or copolyamide chosen from the group consisting of polyphthalamides, and the blends of these polymers and of their copolymers.

It is then advantageous for the ratio by weight of polyamide possessing a star structure in the matrix yarn and/or matrix fibers to be between 0.4 and 1 and preferably at least equal to 0.6.

The matrix yarn and/or matrix fibers can also comprise all the conventional additives, such as flame-retardants, plasticizers, heat and light stabilizers, waxes, pigments, nucleating agents, antioxidants, impact-strength modifiers or analogous compounds which are known to a person skilled in the art.

Advantageously, the reinforcing yarn and/or reinforcing fibers are chosen from carbon, glass, aramid and polyimide yarns and/or fibers.

According to an alternative form of this characteristic, the reinforcing yarn and/or reinforcing fibers are a natural yarn and/or natural fibers chosen from sisal, hemp or flax yarns and/or fibers.

Advantageously, the article according to the invention also comprises a powdered material, the matrix precursor, which can, for example, be a polyamide.

Use will preferably be made of a powder exhibiting a particle size of between 1 and 100 microns.

Preferably, the article according to the invention is the form of continuous or cut yarns, slivers, mats, braids, woven fabrics, knitted fabrics, sheets, multiaxials, nonwovens and/or complex forms comprising several of the abovementioned forms. By way of examples, a complex form can be a sheet combined with a nonwoven or with continuous yarns.

Another subject matter of the invention is a composite material obtained from an article as defined above by at least partial melting of the matrix yarn and/or matrix fibers. This composite material comprises a polymeric matrix and reinforcing yarns and/or reinforcing fibers.

The term "partial melting" is understood to mean the melting of at least a part of at least one matrix yarn and/or one matrix fiber.

This melting can be carried out by thermoforming at a temperature more or less equal to the melting point of the polymeric matrix and under pressure. This melting makes it possible to obtain homogeneous impregnation of the reinforcing yarns and/or reinforcing fibers by the matrix.

According to a preferred characteristic, the composite material thus obtained exhibits a level of reinforcing material by weight of between 25 and 80%.

Yet another subject matter of the invention is a semifinished product obtained by a process of thermoforming or of calendering the abovementioned article, during which the matrix yarn and/or matrix fibers is/are at least partially melted in order to impregnate the reinforcing yarn and/or reinforcing fibers.

More advantageously, this semi-finished product is provided in the form of panels or of tapes.

The semi-finished product consists of an intermediate product, in which the reinforcing yarns and/or reinforcing fibers have been impregnated by the polymeric matrix, which is found in the form of a continuous phase. This product is not yet in its definitive form.

The semi-finished product has to be subjected to a final stage of forming by a forming or thermoforming process which are known to a person skilled in the art, at temperatures greater than the glass transition point and less than their melting point, making it possible to obtain a finished product.

Yet another subject matter of the invention is a finished product obtained by a process of thermoforming the abovementioned article to the definitive form, during which the matrix yarn and/or matrix fibers is/are at least partially melted in order to impregnate the reinforcing yarn and/or reinforcing fibers.

Generally, the thermoforming processes used employ low pressures (less than 20 bar), temperatures of less than 270° C. and short times (less than 5 minutes).

Other details and advantages of the invention will become more clearly apparent in the light of the examples given below, solely by way of indication and by way of illustration.

Matrix used: star polyamide-6, obtained by copolymerization from caprolactam in the presence of 0.5 mol % of 2,2,6,6-tetra(β-carboxyethyl)cyclohexanone according to a process disclosed in the document FR 2 743 077, comprising approximately 80% of star macromolecular chains and 20% of linear macromolecular chains, with a melt flow index, measured at 275° C. under 100 g, of 55 g/10 minutes.

EXAMPLE 1

Semi-Finished Panel Produced from Star Polyamide-6 and Reinforcing Yarns

A series of tests was carried out starting from a multifilament yarn of star polyamide-6 exhibiting a count per strand of between 3 and 8 dTex and a tenacity in the region of 15-20 cN/Tex. Such a multifilament is combined, during a multiaxial weaving operation, with a continuous reinforcing yarn of high performance carbon, comprising 12 000 filaments, or with a reinforcing yarn of glass, exhibiting a count of 600 Tex. In order to validate the high fluidity of the matrix in the molten state, multiaxial fabrics are produced from individual layers, defined as follows:

Individual Layer

Ply No. 1: reinforcing yarn—orientation: −45°
Ply No. 2: reinforcing yarn—orientation: +45°
Ply No. 3: star polyamide-6 yarn (matrix)—orientation: 90°

A laminated composite is subsequently prepared by placing several individual layers (between 2 and 10) of the fabric obtained in a mold exhibiting a panel form, under a heating plate press, for a period of time of 1 to 3 minutes, under a pressure of between 1 and 20 bar and a temperature greater than the melting point of the star polyamide-6 (230-260° C.). After cooling to a temperature of 50-60° C., the composite is removed from the mold. The level by weight of reinforcing material is then between 60-70%.

The high fluidity of the star polymer makes it possible to obtain good impregnation of the reinforcing material by the matrix without bringing about either the declines in mechanical properties or the problems of fatigue strength observed with polymers of low molecular weight. The bending mechanical properties are compared with those of a thermosetting composite obtained from the same reinforcing material and from an epoxy resin in tables Nos. 1.1 and 1.2.

TABLE 1.1

Carbon fiber composites

| Carbon fibers | Breaking stress (MPa) | Flexural modulus (MPa) | Elongation at break (%) |
|---|---|---|---|
| Epoxy matrix | 796.0 | 52 000 | 1.72 |
| Star PA-6 matrix | 536.0 | 54 350 | 1.05 |

TABLE 1.2

Glass fiber composites

| Glass fibers | Breaking stress (MPa) | Flexural modulus (MPa) | Elongation at break (%) |
|---|---|---|---|
| Epoxy matrix | 630.0 | 21 000 | 3.53 |
| Star PA-6 matrix | 580.7 | 21 160 | 3.26 |

The use of a reinforcing material in the form of continuous yarn makes it possible to retain superior mechanical properties in the direction of the unidirectional sheets of reinforcing material. The influence of the temperature on the bending mechanical properties is given in FIG. 1.

Finally, the fact of using the matrix in the form of a yarn makes possible, in addition to an economic advantage with respect to the conventional dusting or preimpregnation solutions, easy handling and very good control of the level of reinforcement of the final composite material.

A summarization of the mechanical properties obtained is given in table No. 3.

TABLE 3

Summarization of the mechanical properties obtained

| | Units | Standard | Star PA-6/carbon multiaxial fabric | Star PA-6/glass multiaxial fabric |
|---|---|---|---|---|
| Level of impregnation (w/w) | % | | 59 | 65 |
| Density | | | 1.4 | 1.8 |
| Simple tension | | | | |
| Tensile strength | MPa | ISO 527 | 1090 | 545 |
| Young's modulus | GPa | ISO 527 | 64 | 21.3 |
| Elongation | % | ISO 527 | 1.7 | 2.76 |
| 3-Point bending | | | | |
| Breaking stress | MPa | ISO 14125 | 536 | 580 |
| Flexural modulus | GPa | ISO 14125 | 54.3 | 21.1 |
| Compression | | | | |
| Breaking stress | MPa | ISO 604 | 210 | 195 |

EXAMPLE 2

Composite Braids

In order to confirm the advantage of the invention for composites with a circular cross section, braids were produced from different star polyamide-6 yarns and from reinforcing materials chosen from those known to a person skilled in the art, such as carbon or glass yarns.

To this end, a mixture was produced during braiding by inserting, on the braiding machine, reinforcing yarns and polyamide yarns. The braid thus obtained is subsequently placed in a hollow mold, the braid being maintained by an internal bladder expanded after closing the mold. Optimum impregnation was thus obtained by virtue of the high fluidity of the star polyamide in the molten state, despite low processing pressures [1-5 bar]. The temperatures employed varying between 230° C. and 260° C., the impregnation time is less than 30 seconds. The composite is subsequently removed from the mold after having been cooled to below the crystallization point of the matrix. It then exhibits a level of reinforcing material by weight which can vary from 65 to 75%. The surface condition of the component is improved by virtue of the fluidity of the polymer.

What is claimed is:

1. A precursor article of a composite material comprising a polymeric matrix and at least one reinforcing yarn and/or reinforcing fibers, said article comprising at least one reinforcing yarn and/or reinforcing fibers and at least one polymeric matrix yarn and/or polymeric matrix fibers, wherein:

said reinforcing yarn and/or said reinforcing fibers are made of reinforcing material and optionally comprise a part made of thermoplastic polyamide, said polymeric matrix yarn and/or said polymeric matrix fibers are made of thermoplastic polyamide, and wherein:

said thermoplastic polyamide of said reinforcing yarn and/or of said reinforcing fibers and/or of said polymeric matrix yarn and/or of said polymeric matrix fibers comprises at least one polyamide possessing a star structure comprising:

star macromolecular chains comprising one or more cores and at least three polyamide branches or three polyamide segments bonded to a core, and optionally, linear polyamide macromolecular chains.

2. The article as claimed in claim 1, wherein the ratio by weight of the star macromolecular chains to the sum of the star macromolecular chains and linear chains in the polyamide possessing a star structure is between 0.1 and 1.

3. The article as claimed in claim 1, wherein said polyamide possessing a star structure is obtained by copolymerization of a mixture of monomers comprising at least:

a) monomers of following general formula (I):

b) monomers of following general formulae (IIa) and (IIb):

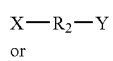

or

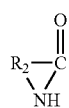

c) and, optionally, monomers of following general formula (III):

Z-R$_3$-Z    (III)

wherein:

R$_1$ is an aliphatic or aromatic, cyclic or linear, hydrocarbonaceous radical comprising at least 2 carbon atoms which can comprise heteroatoms, A is a covalent bond or an aliphatic hydrocarbonaceous radical which can comprise heteroatoms and which comprises from 1 to 20 carbon atoms, Z represents a primary amine functional group or a carboxylic acid functional group, and Y is a primary amine functional group when X represents a carboxylic acid functional group, or Y is a carboxylic acid functional group when X represents a primary amine functional group, R$_2$ and R$_3$, which are identical or different, represent substituted or unsubstituted, aromatic, cycloaliphatic or aliphatic hydrocarbonaceous radicals comprising from 2 to 20 carbon atoms which can comprise heteroatoms, and m represents an integer between 3 and 8.

4. The article as claimed in claim 1, wherein said polyamide possessing a star structure is obtained by extrusion of a polyamide obtained by polymerization of lactams and/or amino acids with the compound of formula (I).

5. The article as claimed in claim 3, wherein A represents a methylene, polymethylene or polyoxyalkylene radical.

6. The article as claimed in claim 3, wherein the compound of formula (I) is 2,2,6,6-tetra(β-carboxyethyl)cyclohexanone, trimesic acid, 2,4,6-tri(aminocaproic acid)-1,3,5-triazine or 4-aminoethyl-1,8-octanediamine.

7. The article as claimed in claim 1, wherein the polyamide possessing a star structure has a number-average molecular mass of at least equal to 15 000.

8. The article as claimed in claim 1, wherein the matrix yarn and/or matrix fibers are obtained from a blend of the polyamide possessing a star structure and of a linear polyamide.

9. The article as claimed in claim 1, further comprising at least one matrix yarn and/or matrix fibers made of linear polyamide.

10. The article as claimed in claim 8, wherein the linear polyamide is an aliphatic and/or semicrystalline polyamide or copolyamide is PA-4,6, PA-6, PA-6,6, PA-6,9, PA-6,10, PA-6,12, PA-6,36, PA-11, PA-12, a semicrystalline semiaromatic polyamide or a semicrystalline semiaromatic copolyamide chosen from the group consisting of polyphthalamides, and the blends of these polymers and of their copolymers.

11. The article as claimed in claim 1, wherein the polyamide possessing a star structure has a ratio by weight in the matrix yarn and/or matrix fibers of between 0.4 and 1.

12. The article as claimed in claim 11, wherein the ratio by weight is at least equal to 0.6.

13. The article as claimed in claim 1, wherein the matrix yarn and/or matrix fibers further comprise additives, selected from the group consisting of flame-retardants, plasticizers, heat and light stabilizers, waxes, pigments, nucleating agents, antioxidants, and impact-strength modifiers.

14. The article as claimed in claim 1, wherein the reinforcing yarn and/or reinforcing fibers are carbon, glass, aramid or polyimide yarns and/or fibers.

15. The article as claimed in claim 1, wherein the reinforcing yarn and/or reinforcing fibers are sisal, hemp or flax yarns and/or fibers.

16. The article as claimed in claim 1, further comprising a powdered material which is the matrix precursor.

17. The article as claimed in claim 16, wherein said powdered material is a polyamide.

18. The article as claimed in claim 1, being in the form of continuous or cut yarns, slivers, mats, braids, woven fabrics, knitted fabrics, sheets, multiaxials or nonwovens.

19. A composite material, obtained from an article as claimed in claim 1, by at least partial melting of the matrix yarn and/or matrix fibers of said article.

20. The composite material as claimed in claim 19, wherein exhibiting a level of reinforcing material by weight of between 25 and 80%.

21. A semi-finished product, obtained by the process comprising the steps of thermoforming or of calendering the article as claimed in claim 1, during which the matrix yarn and/or matrix fibers is/are at least partially melted in order to impregnate the reinforcing yarn and/or reinforcing fibers.

22. The semi-finished product as claimed in claim 21, being in the form of panels or of tapes.

23. A finished product, obtained by the process comprising the step of thermoforming the article as claimed in claim 1 to a final form, wherein the matrix yarn and/or matrix fibers is/are at least partially melted in order to impregnate the reinforcing yarn and/or reinforcing fibers.

* * * * *